United States Patent [19]

Prawdzik et al.

[11] Patent Number: 4,816,314
[45] Date of Patent: Mar. 28, 1989

[54] RELEASE MEDIUM FOR USE IN THE PRODUCTION OF ABRASION-RESISTANT DECORATIVE LAMINATES AND A METHOD FOR THE PRODUCTION OF ABRASION-RESISTANT DECORATIVE LAMINATES

[75] Inventors: John Prawdzik, Dover; Norman F. Maxim, Lunenburg, both of Mass.; William C. Lane, Chillicothe, Ohio; Christo Antonio, Princeton, Mass.

[73] Assignee: Technographics, Inc., Fitchburg, Mass.

[21] Appl. No.: 915,644

[22] Filed: Oct. 6, 1986

Related U.S. Application Data

[63] Continuation of Ser. No. 694,961, Jan. 25, 1985, abandoned.

[51] Int. Cl.⁴ .............................................. B32B 31/12
[52] U.S. Cl. .................................... 156/235; 156/247; 156/279; 156/288; 156/289; 156/307.5; 428/143; 428/323; 428/329; 428/331
[58] Field of Search ............... 428/143, 144, 323, 329, 428/331, 503, 526, 531; 156/247, 235, 288, 289, 307.4, 323, 279

[56] References Cited

U.S. PATENT DOCUMENTS

| | | | |
|---|---|---|---|
| 4,030,955 | 6/1977 | Antonio et al. | 156/289 |
| 4,263,077 | 4/1981 | Rampelberg | 156/279 |
| 4,263,081 | 4/1981 | Scher et al. | 428/172 |
| 4,293,360 | 10/1981 | Loft et al. | 156/289 |
| 4,327,141 | 4/1982 | Scher et al. | 428/148 |
| 4,505,974 | 3/1985 | Hosler | 428/329 |
| 4,689,102 | 8/1987 | Prawdzik et al. | 428/143 |

*Primary Examiner*—Paul J. Thibodeau
*Attorney, Agent, or Firm*—Peter J. Georges

[57] ABSTRACT

An improved release medium is disclosed for use in the production of decorative laminates by pressure consolidation. The release medium comprises a self-sustaining release sheet having at least one of its surfaces coated with a composition comprised of mineral particles dispersed in a resinous matrix. The release medium may be used to apply an abrasion-resistant coating to the surface of a decorative laminate during production of the laminate by pressure consolidation.

12 Claims, 2 Drawing Sheets

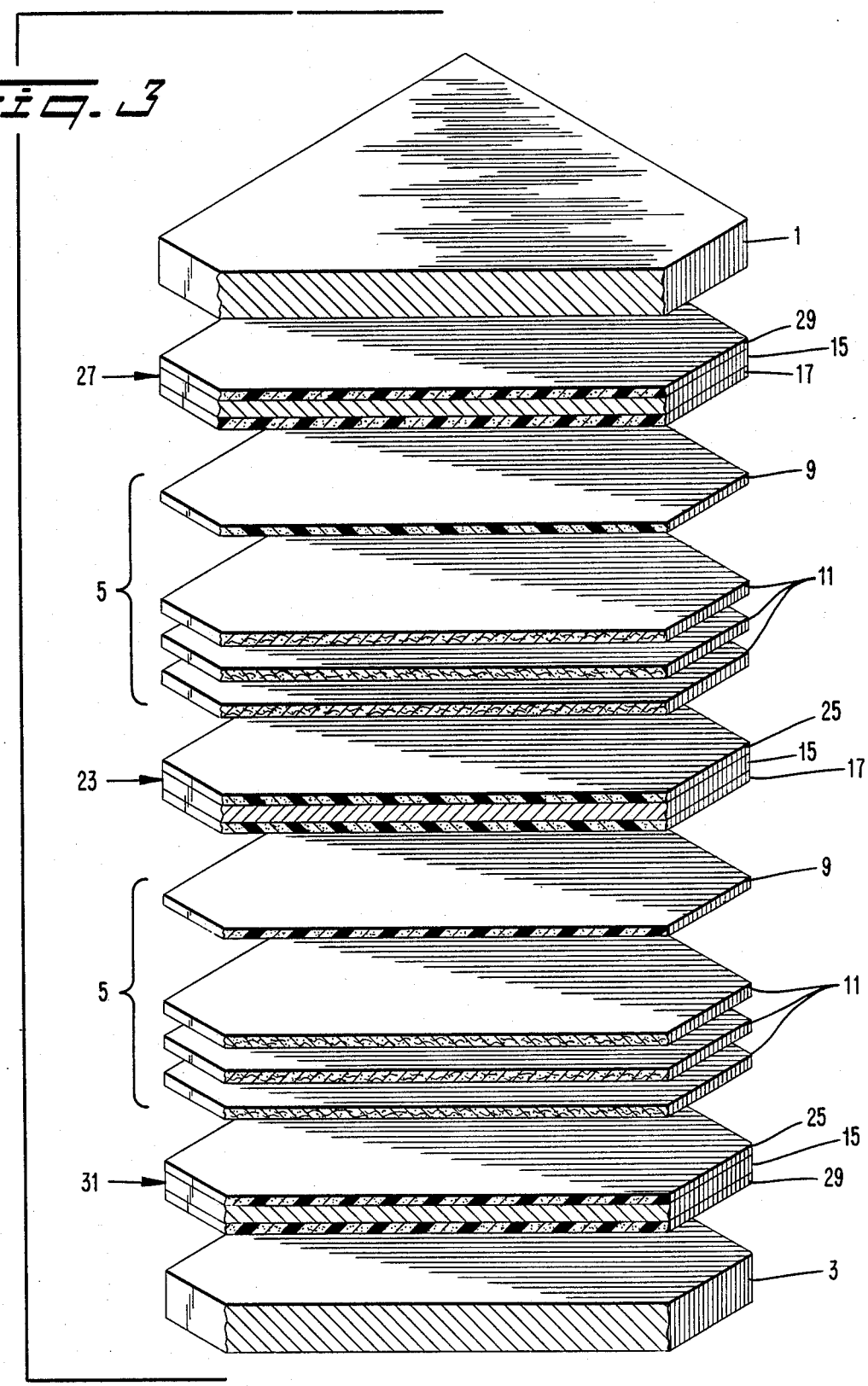

RELEASE MEDIUM FOR USE IN THE PRODUCTION OF ABRASION-RESISTANT DECORATIVE LAMINATES AND A METHOD FOR THE PRODUCTION OF ABRASION-RESISTANT DECORATIVE LAMINATES

This application is a continuation of application Ser. No. 694,691 filed Jan. 25, 1985 now abandoned.

CROSS-REFERENCE TO RELATED APPLICATIONS

The subject matter of the present application is related to the subject matter of copending application Ser. No. 684,283, filed Dec. 20, 1984, now U.S. Pat. No. 4,689,102 entitled "Release Medium For Use In The Production Of Decorative Laminates And A Method For The Production Of Decorative Laminates", of Joseph R. Gallagher and Frank E. Flynn.

BACKGROUND OF THE PRESENT INVENTION

The present invention is directed to a method for the production of decorative laminates which are employed in conjunction with a substrate such as particle board for use in countertops, furniture and the like.

In making decorative laminates, a plurality of sheets are impregnated with a thermosetting resin and stacked in superimposed relation with a decorative sheet placed on top. This assembly is then heat and pressure consolidated. Generally, more than one laminate is formed at one time by inserting a plurality of sheet assemblies in a stack with each assembly being separated by a release medium which allows the individual laminates to be separated after heat and pressure consolidation.

The laminates so formed are then bonded to a substrate such as plywood, hardboard, asbestos board, particle board, and the like by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found to be desirable during the production of such laminates to impart to the decorative surface portion of the laminate abrasion-resistant characteristics to enhance the utility of such laminates as table and countertops, wall panels and floor surfacing. Such abrasion resistance has in the past been imparted to decorative laminates having a printed decorative sheet by means of an applied overlay sheet which provided a transparent barrier over the decorative print sheet. Resin coatings have also been applied to the surface of the laminate which coatings contain abrasion-resistant mineral particles. Note in this regard U.S. Pat. Nos. 3,135,643; 3,373,070; 3,373,071; 3,798,111; 3,928,706; 4,255,480; 4,263,081; 4,305,987; 4,322,468; 4,327,141; 4,395,452; 4,400,423; and 4,430,375.

The above-noted methods, while generally providing satisfactory results, are undesirable in that they require either the use of additional materials (i.e., the overlay sheet) or the use of additional coating steps. Such disadvantages result in lessened efficiency and cost-effectiveness of the abrasion-resistant characteristics thereby provided.

OBJECTS AND SUMMARY OF THE INVENTION

It is therefore an object of the present invention to provide an improved release medium for use in the production of decorative laminates.

It is another object of the present invention to provide an improved release medium for use in the production of decorative laminates which enables multiple laminates to be formed having abrasion-resistant characteristics.

It is yet another object of the present invention to provide an improved release medium for use in the production of decorative laminates whose use may enable the use of an overlay sheet to be avoided.

It is still yet another object of the present invention to provide an improved method for the production of decorative laminates wherein the use of an overlay sheet may be avoided.

It is still yet another object of the present invention to provide an improved method for the production of decorative laminates by means of pressure consolidation wherein increased efficiency is achieved.

In accordance with the present invention, there is thus provided a release medium for use in the production of decorative laminates by pressure consolidation comprised of a self-sustaining release sheet, the improvement wherein the release sheet has at least one surface coated with a composition comprised of abrasion-resistant mineral particles dispersed in a resinous matrix.

In yet another aspect of the present invention, there is provided a method for the production of decorative laminates comprising:

(a) providing at least one release medium comprised of a self-sustaining release sheet having opposing first and second surfaces;

(b) providing at least one decorative laminate sheet assembly comprised of at least one core sheet and a decorative sheet;

(c) positioning said at least one release medium adjacent said decorative sheet of said at least one decorative laminate sheet assembly; and (d) forming at least one decorative laminate from said at least one decorative laminate sheet assembly by the application of heat and/or pressure; the improvement wherein said at least one release medium includes on a surface adjacent said decorative sheet a coating of a composition comprised of abrasion-resistant mineral particles dispersed in a resinous matrix whereby an abrasion-resistant coating is formed on the surface of said decorative sheet of said at least one decorative laminate during said application of heat and/or pressure.

BRIEF DESCRIPTION OF THE DRAWINGS

FIGS. 1–3 are exploded views of decorative laminate sheet assemblies about to be formed into decorative laminates in a laminating press.

DETAILED DESCRIPTION OF THE INVENTION

The present invention will be described in detail in conjunction with reference to FIGS. 1–3, with like elements being numbered identically.

The Figures depict a conventional laminating press having press assemblies 1, 3 which are employed to consolidate by means of heat and/or pressure superimposed decorative laminate sheet assemblies 5 which are placed in the press. The sheet assemblies 5 upon consolidation yield a decorative laminate having a decorative surface which surface if printed would normally underlie an overlay sheet whose use may be avoided by practice of the present invention. The sheet assemblies 5 which are illustrated include a decorative sheet 9 which may comprise either a printed sheet or a solid color sheet.

Several layers of core stock 11 (e.g., kraft paper) are further employed beneath the decorative sheet 9 to impart the necessary rigidity to the laminate upon formation and/or consolidation. The core stock sheets are impregnated with a thermosetting resin in a conventional manner in order to enhance their function with regard to imparting rigidity. Preferably a phenolic resin is so employed. The decorative sheet is also impregnated with a thermosetting resin, with a clear melamine-formaldehyde resin preferably being used in the decorative sheet. The use of such resins in the noted sheets is conventional and the selection of alternative thermosetting resins is within the skill of the routineer in the art.

Figure 1:
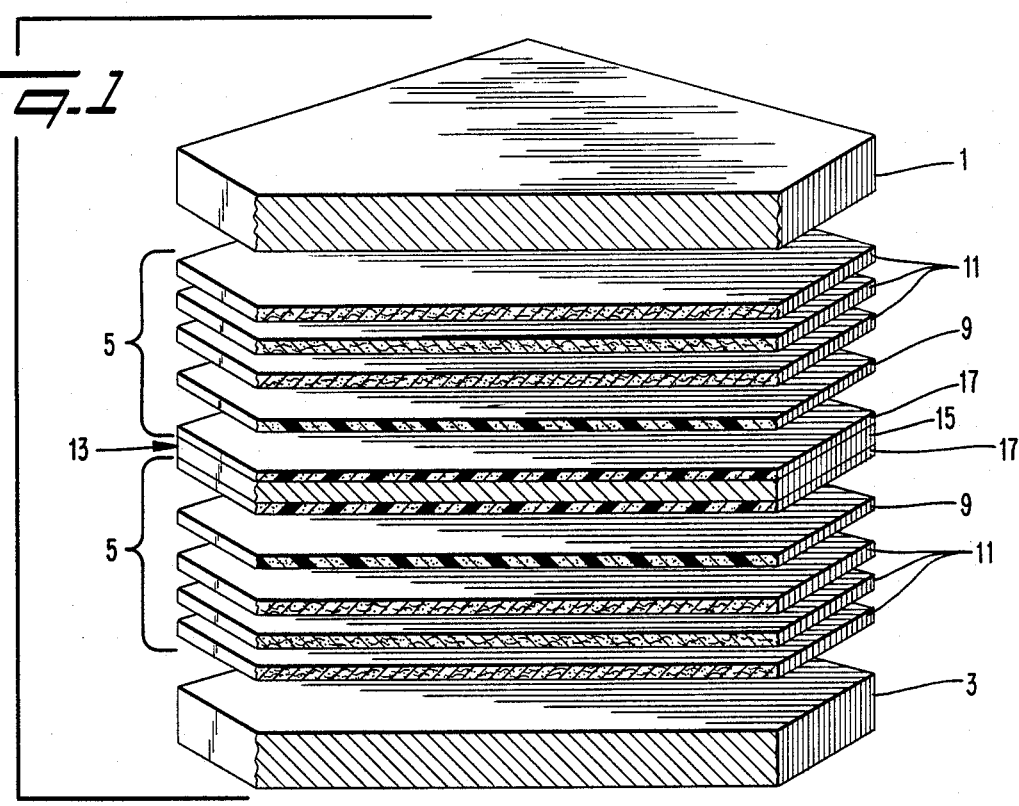

By way of explanation, in the disclosed embodiment of FIG. 1, the press assembly 1 would normally consist of a heavy press platen capable of providing the necessary heat and/or pressure during lamination, an optional adjacent press plate and padding stock (e.g., several layers of kraft paper). The press assembly 3 in such an embodiment would normally consist of a platen, a carrier plate, padding stock and a steel caul or press plate (either textured or polished). In order to simplify the Figures these various elements have been collectively identified as press assemblies 1, 3.

Figure 2:
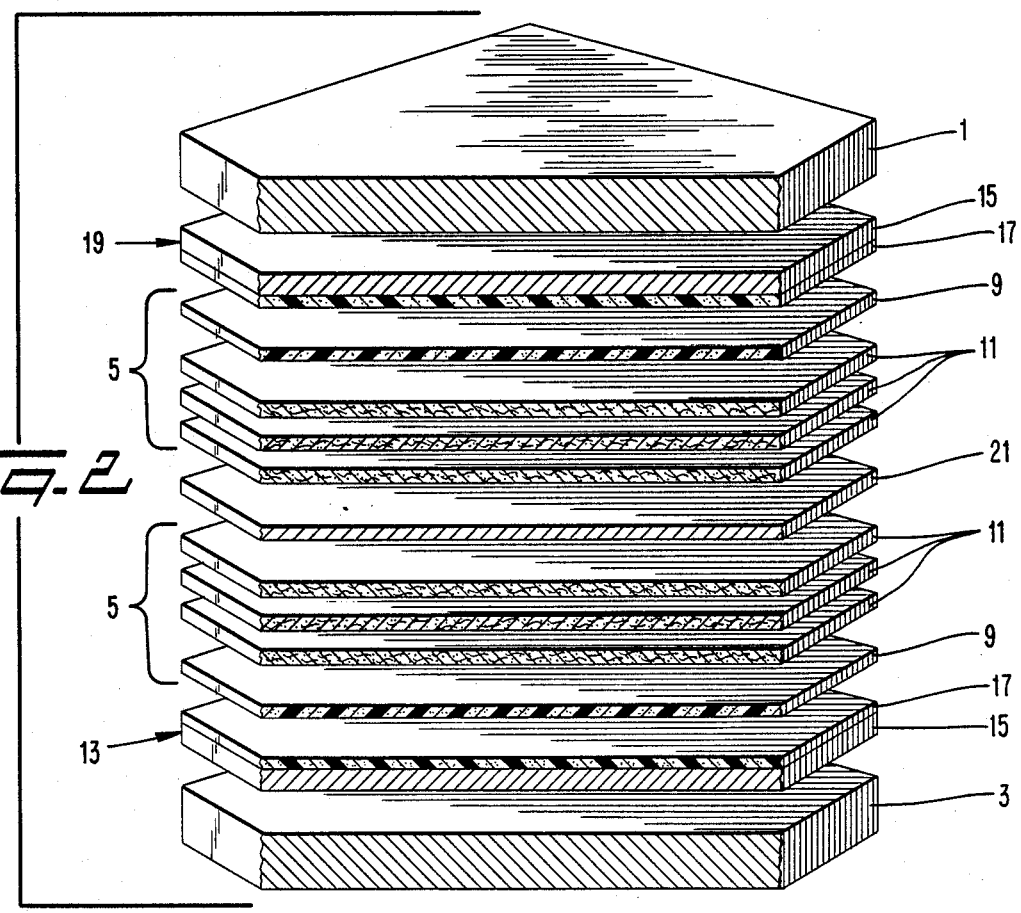

Also, while the decorative sheet assemblies have been depicted in FIG. 1 as having the decorative surfaces of the assemblies facing each other in a face-to-face relationship, certainly the orientation of the assemblies could be such that they are aligned in a back-to-back relationship as depicted in FIG. 2 or aligned in a face-to-back relationship as depicted in FIG. 3. For purposes of the description of the invention, reference to the "uppermost" surface of a decorative sheet assembly is intended to make reference to the decorative surface of the assembly regardless of how the assembly is oriented within the press.

The basis of the present invention resides in the use of the release medium 13 during pressure consolidation of the sheet assemblies to form a decorative laminate. The release medium 13 comprises release sheet 15 having a coating 17 on at least one surface consisting of a composition comprised of abrasion-resistant mineral particles dispersed in a resinous matrix. The remaining surface may either remain uncoated, be coated with the same abrasion-resistant composition, be coated with a release coating or be coated with a non-sanding coating.

The release sheet 15 may be comprised of a variety of materials which do not soften and/or become tacky under the conditions employed during the pressure consolidation process. For example, synthetic resins may be employed including but not being limited to polyolefins and polyesters such as polypropylene, polybutylene, polyethylene terephthalate, etc. Polyurethane films may also be used. Other exemplary release sheets include paper, metallic foil or paper-metallic foil laminates wherein single or double layers of foil are employed (e.g., where the paper is sandwiched between two foil layers). Aluminum foil is the preferred foil in the event that the release sheet comprises a metallic foil or paper-metallic foil laminate.

The thickness of the release sheet 15 is not critical to the operation of the present invention and is generally only limited by cost and ease of handling. Generally, the thickness of the release sheet will be at least about 0.5 mil and preferably ranges from about 1 to 5 mils.

The abrasion-resistant mineral particle-containing coating 17 comprises abrasion-resistant mineral particles dispersed in a suitable resinous matrix. Exemplary particles include but are not limited to particles of silica, alumina, alundum, corundum, emery, spinel, tungsten carbide, zirconium boride, titanium nitride, tantalum carbide, beryllium carbide, silicon carbide, aluminum boride, boron carbide and diamond dust. Desirably, such materials exhibit a hardness of at least 7 on the Moh hardness scale.

The selection of the most suitable material is dependent upon several factors including color compatibility, hardness, cost, particle size, etc. For example, silica and alumina are essentially colorless materials whose presence would not detrimentally detract from the appearance of the decorative sheet.

Such particles would generally be employed in a particle size range of from about 10 micron average particle size up to about 75 micron average particle size, and preferably between about 20 and 50 microns. The use of particles within the noted range enables the desired abrasion resistance to be achieved without excessive interference with the appearance of the decorative laminate. It is also desirable for the particles to be sized fairly closely together such that the difference between the smallest and largest average particle sizes is not significant.

The abrasion-resistant particles are dispersed in a suitable resinous matrix that is capable of transfer to the adjacent decorative laminate sheet assembly during the conditions employed during pressure consolidation while forming a substantially continuous film. While various resins are suitable for use as the matrix resin, the resin is preferably selected from the same group of resins which are conventionally employed to impregnate the decorative sheet in order to enhance the compatibility of the resins from a visual standpoint. Most preferably, either the same melamine (e.g., melamine aldehyde) resin or compatible melamine resins are employed in both the decorative sheet impregnation and as the matrix resin. Polyester and acrylic resins may also be employed. Phenolic resins are not desirable as they are susceptible to discoloration. Exemplary melamine resins include Cymel 409 and Cymel 412 (American Cyanamid).

The particles comprise approximately from about 2 to 15 percent by weight of the matrix resin, based on the weight of the resin. The abrasion-resistant coating may be applied to the surface or surfaces of the release sheet by any suitable coating means. One skilled in the art can readily determine an acceptable means by which the release sheet can be coated with the abrasion-resistant coating. The mixture of resin and mineral particles are generally combined in admixture with a solvent for the resin. For example, the resin may be admixed with a solvent in weight ratios ranging from about 1:1 to 4:1, respectively. In the case of various water-soluble melamine-formaldehyde resins, either water or alcohol-based solvents may be employed, with water temperatures in the range of about 50° to 95° C., preferably from about 60° to 70° C., being employed during formation of the coating.

The coating may be applied in various amounts to the release sheet, with the coating being applied in an amount sufficient to ensure that abrasion-resistant properties are transferred to the decorative sheet during lamination in the form of an abrasion-resistant coating. For example, the coating is generally applied in amounts ranging from about 0.001 to 0.006 lbs/ft$^2$ of the release sheet. The coating thickness will generally range from about 0.4 to 1.0 mil. Once applied, the resin is dried to the B stage by suitable means such as in a forced air oven at a sufficient temperature and for a sufficient time (e.g., at from 100° to 110° C. for a few minutes).

It is also advantageous for the coating composition to include a viscosity-improver in order to increase the viscosity of the abrasion-resistant composition. The presence of such an additive serves to prevent both disadvantageous settling of the mineral particles within the resin and clumping of the particles such that the coating which is eventually transferred to the decorative sheet effectively provides the desired abrasion-resistant properties. The additive also helps to anchor the coating to the substrate. Exemplary viscosity-improvers include but are not limited to known additives such as carboxymethyl-cellulose, hydroxypropyl-cellulose, methylcellulose, polyvinyl alcohol, polyvinyl pyrrolidone, etc. Such viscosity-improvers are advantageously employed in an amount ranging from about 0.5 to 4.0 percent by weight, based on the weight of the coating composition, preferably from about 1.0 to 4.0 percent by weight.

Furthermore, it has been found advantageous for a surface active agent to be employed in the composition if the composition is to be applied to a release sheet whose surface is not easily wettable by the resin-based composition (such as caul stock). In such an instance, the presence of the surface active agent enables the composition to be uniformly spread across the surface of the substrate without disadvantageous beading of the composition. Such surface active agents, if present, are advantageously employed in amounts ranging from about 0.01 to 1.0 percent by weight, based on the weight of the coating composition, preferably from about 0.1 to 0.5 percent by weight. The amount of surfactant employed will vary as to the type of substrate to which the coating is applied. That is, application of the coating to silicone-treated caul stock will necessitate the use of more surface active agent than will the application of the coating to aluminum foil. Exemplary surface active agents include Zonyl FSJ (DuPont) and Strodex PK90 (Dexter Chemical Co.).

While the FIG. 1 embodiment is directed to the use of a release medium having the abrasion-resistant particle-containing coating 17 on both sides of the release sheet 15 in order to apply an abrasion-resistant surface to the adjacent decorative sheet assemblies 5 oriented in a face-to-face relationship, certainly only a single abrasion-resistant coating need be employed.

For example, FIG. 2 depicts the use of a release medium 19 having a release sheet 15 and a single abrasion-resistant coating 17 applied thereto. The remaining surface of the release sheet remains uncoated. In such an embodiment, the decorative sheet assemblies 5 are oriented in a back-to-back relationship within the lamination process. A conventional release sheet 21 is placed between the adjacent back portions of the sheet assemblies to ensure separation of the assemblies from each other upon lamination. The use of such conventional release sheets is known to those skilled in the art and will not be discussed in greater detail.

It is also feasible for other types of coatings to be employed in conjunction with the abrasion-resistant coating on the release medium. As depicted in FIG. 3, a release medium 23 is employed having a release sheet 15 having an abrasion-resistant coating 17 and non-sanding coating 25 thereon. In such an embodiment the sheet assemblies 5 can be advantageously positioned within the press in a face-to-back relationship.

The non-sanding coating 25 is comprised of a material that is capable of transfer to the opposing surface of the sheet assembly during the pressure consolidation step while forming a substantially continuous film. As a result, one surface of the decorative laminate thus produced will be amenable to adhesive bonding to a supporting substrate without the need for additional pre-adhesion preparation of that surface (e.g., by the sanding of the surface). The other surface will have abrasion-resistant properties imparted to it as a result of the pressure consolidation step.

Exemplary materials for use as the non-sanding coating 25 include but are not limited to polyvinyl alcohol, animal glue and starch. Animal gelatin, a more refined type of animal glue, also functions satisfactorily and is intended to be included with the scope of the term animal glue. Polyvinyl alcohol is the preferred material for use as the non-sanding coating.

The thickness of the non-sanding coating is also not critical but will generally be at least about 0.10 mil in thickness. The non-sanding coating preferably ranges from about 1 to 4 mils in thickness.

An exemplary non-sanding coating composition which may be employed comprises on a dry solid basis:
Polyvinyl alcohol: 100 parts
Talc: 43 parts
Calgon (sodium hexamethaphosphate): 10 parts
Formaldehyde: 1.33 parts
Glycerol: 1.33 parts A coating batch may be prepared by mixing a 20 percent aqueous solution of polyvinyl alcohol with a 50 percent slurry of talc and Calgon with the proportion being above set forth. A 37 percent aqueous solution of formaldehyde and a 40 percent solution of glycerol are then added to the batch in proportional amounts as above set forth. The batch is then diluted with water so as to provide a viscosity of 800 centipoises so as to make the same suitable for coating.

Fillers, cross linking agents and wetting agents may be added to the non-sanding coating 25. The amounts of the non-sanding coating employed should be sufficient to form a substantially continuous film upon transfer to the opposing surface during heat and pressure consolidation. Generally, this requires at least about 10 percent of the coating to be polyvinyl alcohol or other suitable material on a dry solid basis. Preferably, the coating comprises is at least about 40 percent by weight of polyvinyl alcohol or other material.

While not necessary, a filler such as talc may be added to improve the bond especially when an adhesive such as urea-formaldehyde is used to adhere the laminate to its supporting substrate.

Cross-linking agents such as formaldehyde and/or glyoxal may also be used to ensure that polyvinyl alcohol is water insolubilized to prevent moisture swell in the finished laminate.

A wetting agent such as that marketed under the trademark Calgon (sodium hexamethaphosphate) may be added to enhance the wettability of the surface.

Alternatively, the release medium may employ a release coating in conjunction with the abrasion-resistant coating as noted in the release medium 27 of FIG. 3 which has release coating 29 on one surface of release sheet 15 and an abrasion-resistant coating 17 on the other surface. Abrasion-resistant properties are thus transferred to the decorative surface of the adjacent sheet assembly upon lamination while the release coating 23 serves to enhance separation of the release medium 21 from the adjacent press assembly upon lamination.

At the bottom of the stack a release medium 31 may be employed which imparts non-sanding properties to the bottom surface of the adjacent sheet assembly by transfer of non-sanding coating 25 during lamination. Release coating 29 on the remaining surface of the release medium 31 serves to enhance separation from the adjacent press assembly upon lamination. A release medium of this type is the subject of and described in earlier-filed copending U.S. patent application Ser. No. 684,283, filed Dec. 20, 1984, of Joseph R. Gallagher and Frank E. Flynn entitled "Release Medium For Use In The Production Of Decorative Laminates And A Method For The Production Of Decorative Laminates".

The release coating 29 may comprise a variety of conventional materials which enable the release medium 27, 31 to readily separate from the adjacent press assembly subsequent to the formation of the laminate and completion of the lamination process. Typically, a silicone-containing layer will be employed as the release coating although various stearates (such as marketed by DuPont under the trademark Quillon), fluorocarbons, waxes or oils may also be employed. Fillers may also be added to the release coating to control gloss on the face of the laminate. The thickness of the release coating is also not critical although the coating should be present in an amount sufficient to enable the desired separation to occur.

During the lamination process itself, conditions of temperature and pressure are employed sufficient to form the requisite laminates without incurring damage due to excessive heat or pressure. For example, pressures in the range of about 700 to 1100 psi and temperatures in the range of about 130° to 230° C. may be employed. Preferably, a pressure of about 850 psi and a temperature of about 160° C. are employed. Time periods of 45 to 90 minutes are usually sufficient to achieve the desired lamination. Most advantageously, textured caul plates are employed during the lamination step to enhance the abrasion-resistant properties which are imparted to the decorative laminate.

Subsequent to lamination the resulting consolidated assemblies may be easily removed from the press and separated from each adjacent release medium. The abrasion-resistant coating will also be successfully transferred to the opposing decorative surface of the assembly as will any non-sanding coating that may be present. In the event that a printed decorative sheet is employed instead of a solid color sheet, the application of the abrasion-resistant resinous coating to the surface of the printed decorative sheet will enable the use of an overlay sheet to be avoided. The laminates can subsequently be attached to a suitable supporting substrate (e.g., particle board) using a conventional adhesive such as urea-formaldehyde and phenol resorcinol.

The invention is additionally illustrated in connection with the following Example which is to be considered as illustrative of the present invention. It should be understood, however, that the invention is not limited to the specific details of the Example.

EXAMPLE

Various decorative laminates were produced in accordance with the present invention as follows.

A melamine resin-solvent admixture was formed to which was added alumina abrasion-resistant particles in various percentages by weight (based on the weight of the resin). The resin employed was Cymel 412 melamine resin (American Cyanamid). A surface active agent (Zonyl FSJ from DuPont) and a viscosity-increasing agent (carboxymethylcellulose) were also added to various of the samples to complete the coating composition. The coating was then applied to the surface of several sheets of aluminum foil (1 mil thick) by means of a draw down bar of sizes 8, 12, 14, 16, 18 and 20 to provide a coating of differing thicknesses on the sheets. The coatings applied ranged in weight from about 0.002 to 0.004 lbs/ft$^2$. Once applied, the coating was air dried in an oven for a few minutes at a temperature in the range of 100° to 110° C. sufficient to cure the resin to the B stage and form a release medium according to the present invention. The compositions of the various coatings which were formed are identified in Table I below.

Once formed, the coated foil sheets were employed in the production of abrasion-resistant laminates also in accordance with the present invention. Decorative sheet assemblies comprised of four sheets of phenolic-saturated core stock, one sheet of either a melamine-saturated solid decorative sheet or printed decorative sheet, and one of the coated foil sheets were formed and pressed for twelve minutes at approximately 145° C. and subsequently cooled under pressure for six minutes. A "Martin Decker" laminating press was employed at a ram pressure of 300,000 psi, which pressure is higher than would normally be employed but was employed for purposes of testing as it constituted the preset press setting.

The decorative laminates thus formed were tested for abrasion-resistance by means of a Table Abrasion Tester using the four quadrant wear test. The laminates were found to possess acceptable abrasion-resistance.

TABLE I

| Run | Resin (grams) | Solvent (grams) | Alumina Particles (wt %) | Viscosity Agent (grams) | Surface Active Agent (grams) | Draw-Down Rod # |
|---|---|---|---|---|---|---|
| 1 | 100 | 25 | 2.0 | 0 | 0.03 | 8 |
| 2 | 100 | 25 | 2.0 | 0 | 0.03 | 14 |
| 3 | 100 | 25 | 2.0 | 0 | 0.03 | 18 |
| 4 | 74 | 18.5 | 2.0 | 0 | 0.60 | 8 |
| 5 | 74 | 18.5 | 2.0 | 0 | 0.60 | 12 |
| 6 | 74 | 18.5 | 2.0 | 0 | 0.60 | 16 |
| 7 | 35.5 | 8.9 | 2.0 | 0 | 0.40 | 8 |
| 8 | 35.5 | 8.9 | 2.0 | 0 | 0.40 | 12 |
| 9 | 35.5 | 8.9 | 2.0 | 0 | 0.40 | 16 |
| 10 | 150 | 150 | 4.0 | 1.5 | 0.60 | 12 |
| 11 | 150 | 150 | 4.0 | 1.5 | 0.60 | 16 |
| 12 | 150 | 150 | 4.0 | 1.5 | 0.60 | 20 |
| 13 | 150 | 150 | 4.0 | 1.5 | 0.60 | 12 |
| 14 | 150 | 150 | 4.0 | 1.5 | 0.60 | 16 |
| 15 | 150 | 150 | 4.0 | 1.5 | 0.60 | 20 |
| 16 | 150 | 150 | 4.0 | 1.5 | 0.60 | 12 |

TABLE I-continued

| Run | Resin (grams) | Solvent (grams) | Alumina Particles (wt %) | Viscosity Agent (grams) | Surface Active Agent (grams) | Draw-Down Rod # |
|---|---|---|---|---|---|---|
| 17 | 150 | 150 | 4.0 | 1.5 | 0.60 | 16 |
| 18 | 150 | 150 | 4.0 | 1.5 | 0.60 | 20 |

Solvent employed:
Isopropyl alcohol (runs 1-9)
Warm water (runs 9-18)
Alumina particles employed:
Micro Abrasives Corporation Microgrit WCA-20 (runs 7-12)
Micro Abrasives Corporation Microgrit WCA-30 (runs 1-3, 13-15)
Micro Abrasives Corporation Microgrit WCA-40 (runs 4-6, 16-18)
Viscosity Agent: Hercules, Inc. CMC 7LT (runs 10-18)

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a method for the production of decorative laminates by pressure consolidation comprising:
   (a) providing at least one release medium comprised of a self-sustaining release sheet having opposite first and second surfaces;
   (b) providing at least one decorative laminate sheet assembly comprised of at least one core sheet and a decorative sheet;
   (c) positioning said at least one release medium adjacent said decorative sheet of said at least one decorative laminate sheet assembly; and
   (d) forming at least one decorative laminate from said at least one decorative laminate sheet assembly by the application of heat and pressure; the improvement which comprises forming on said at least one release medium on a surface adjacent said decorative sheet a coating of a composition comprised of abrasion-resistant mineral particles dispersed in a resinous matrix by applying a layer of abrasion-resistant mineral particles dispersed in an uncured resinous matrix; and then, curing said matrix to the B-stage whereby an abrasion-resistant coating is formed on the surface of said decorative sheet of said at least one decorative laminate during said application of heat and pressure.

2. The method of claim 1 wherein said self-sustaining release sheet is selected from the group consisting of paper, metallic foil, a paper-metallic foil laminate and a synthetic resin film.

3. The method of claim 1 wherein said release sheet is comprised of a synthetic resin selected from the group consisting of polypropylene, polybutylene and polyethylene terephthalate.

4. The method of claim 1 wherein said release sheet is comprised of a metallic foil.

5. The method of claim 4 wherein said foil is an aluminum foil.

6. The method of claim 2 wherein said release sheet is comprised of a paper-metallic foil laminate.

7. The method of claim 6 wherein said foil laminate is comprised of a paper substrate and outer layers of aluminum foil.

8. The method of claim 1 wherein said abrasion-resistant particles are selected from the group consisting of silica, alumina, alundum, corundum, emery, tungsten carbide, beryllium carbide, silicon carbide, aluminum boride, boron carbide, diamond dust and mixtures thereof.

9. The method of claim 8 wherein said particles comprise alumina particles.

10. The method of claim 1 wherein said particles range in size from about 10 micron average particle size to about 75 micron average particle size.

11. The method of claim 1 wherein said resinous matrix comprises a melamine resin.

12. The method of claim 1 wherein said mineral particles are present in an amount ranging from about 2 to 15 percent by weight based on the weight of the resin.

* * * * *